US009821727B2

(12) United States Patent
Weikert et al.

(10) Patent No.: US 9,821,727 B2
(45) Date of Patent: Nov. 21, 2017

(54) ASSEMBLY MODULE

(75) Inventors: Günther Weikert, Aidlingen (DE); Peter Ulomek, Radevormwald (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 675 days.

(21) Appl. No.: 13/063,158

(22) PCT Filed: Sep. 8, 2009

(86) PCT No.: PCT/EP2009/061600
§ 371 (c)(1),
(2), (4) Date: May 19, 2011

(87) PCT Pub. No.: WO2010/029059
PCT Pub. Date: Mar. 18, 2010

(65) Prior Publication Data
US 2011/0210151 A1    Sep. 1, 2011

(30) Foreign Application Priority Data

Sep. 9, 2008  (DE) .................. 10 2008 046 454
Dec. 2, 2008  (DE) .................. 10 2008 059 918

(51) Int. Cl.
*B60R 11/04*    (2006.01)
(52) U.S. Cl.
CPC ................... *B60R 11/04* (2013.01)
(58) Field of Classification Search
CPC . H04N 7/18; H04N 7/181; B60R 1/00; B60R 11/04; B60N 2/002; G06K 9/00832; B60Q 1/22
See application file for complete search history.

(56) References Cited

U.S. PATENT DOCUMENTS 3,708,822 A * 1/1973 Buchwald ................. 15/250.03
6,130,614 A * 10/2000 Miller et al. .............. 340/573.4
(Continued)

FOREIGN PATENT DOCUMENTS

CN       1546341 A      11/2004
CN    101038416 A       9/2007
(Continued)

OTHER PUBLICATIONS

Translation of JP 2001058543 by A Asada K, Camera mounting structure for vehicle has stoppage body that occludes opening that accommodates camera and which is moved outward to expose camera; Mar. 6, 2001.*

(Continued)

*Primary Examiner* — Zhubing Ren
(74) *Attorney, Agent, or Firm* — Agris & Von Natzmer, LLP; Joyce Von Natzmer

(57) ABSTRACT

The invention relates to an assembly module on a mobile part (1) of a motor vehicle, especially on a tailgate (1), comprising a housing (10) having a camera (11) which serves to record images of the exterior surrounding a motor vehicle, an actuating element (13) for activating a mechanical lock (2) of the mobile part (1), and a mobile protective element (12) which can be displaced between a closed position (3) and an open position (4). In the open position (4), the actuating element (13) is freely accessible for the user and images can be recorded of the surrounding exterior (5). In the closed position (3), the protective element (12) covers the actuating element (13) and the camera (11) at the same time.

34 Claims, 3 Drawing Sheets

(56) References Cited

U.S. PATENT DOCUMENTS

| | | | |
|---|---|---|---|
| 6,204,754 B1* | 3/2001 | Berstis | 340/435 |
| 6,819,231 B2* | 11/2004 | Berberich et al. | 340/435 |
| 2003/0146831 A1* | 8/2003 | Berberich | B60R 11/04 340/461 |
| 2009/0309971 A1* | 12/2009 | Schuetz | B60R 11/04 348/148 |

FOREIGN PATENT DOCUMENTS

| | | |
|---|---|---|
| CN | 200988459 Y | 12/2007 |
| DE | 20219004 | 3/2003 |
| DE | 10204764 | 8/2003 |
| DE | 102004050297 | 4/2006 |
| DE | 102005021672 | 11/2006 |
| DE | 602004003255 | 5/2007 |
| DE | 102006039192 | 2/2008 |
| DE | 102006048371 | 4/2008 |
| DE | 102006048373 | 4/2008 |
| DE | 102007052402 | 5/2009 |
| FR | 2859425 | 3/2005 |
| FR | 2859426 | 3/2005 |
| JP | 2001058543 * | 3/2001 |

OTHER PUBLICATIONS

International Search Report; PCT/EP2009/061600; dated Aug. 19, 2010.

* cited by examiner

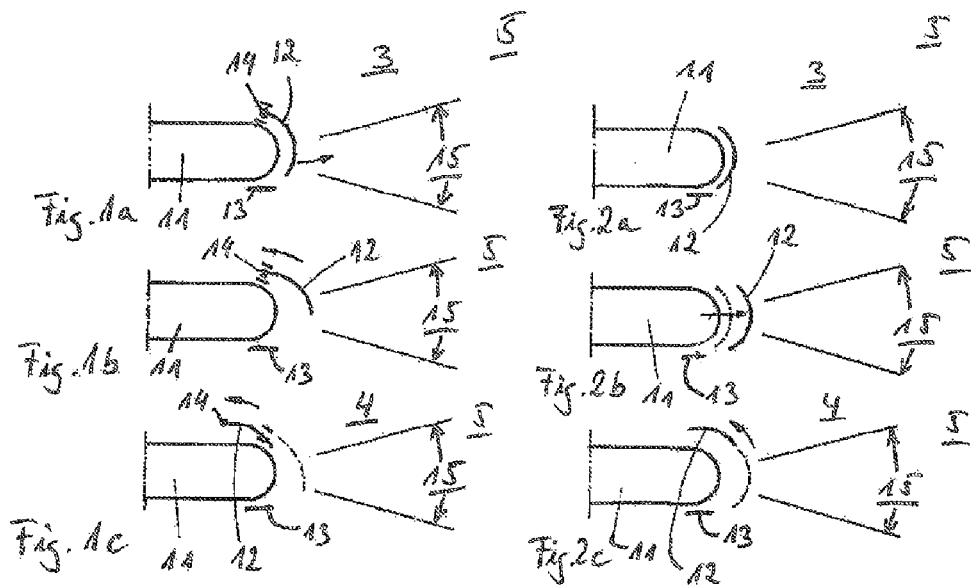
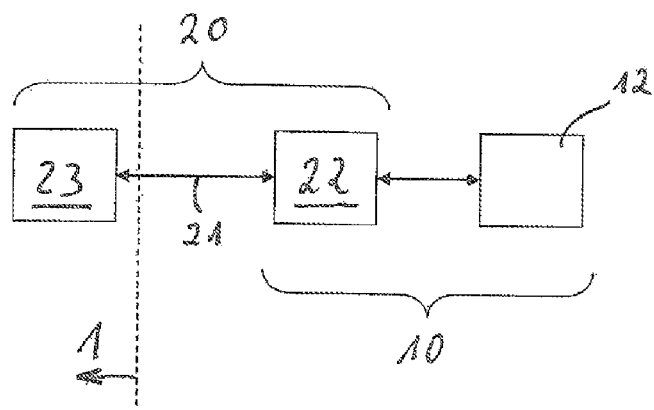

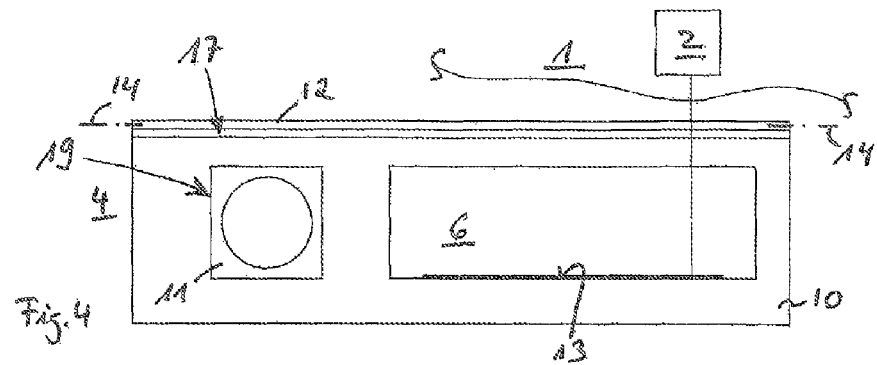
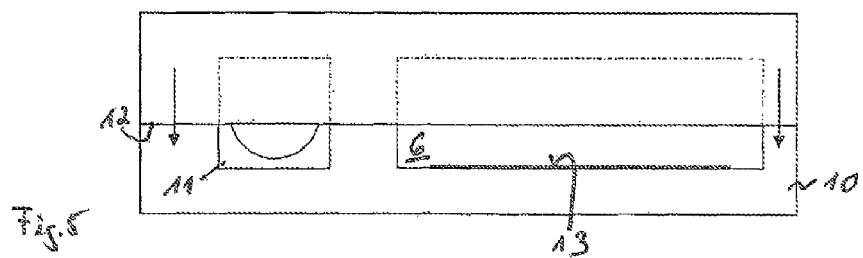
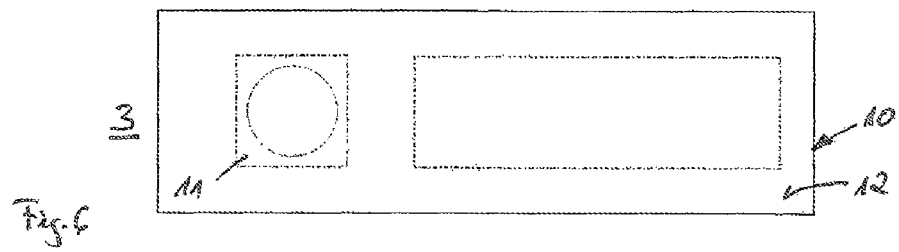
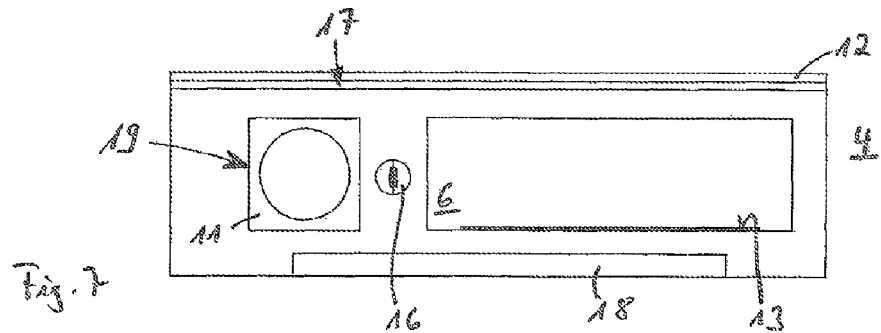

ASSEMBLY MODULE

TECHNICAL FIELD

The invention concerns a mounting module on a moving part of a vehicle, especially on a trunk lid.

BACKGROUND

A device with a camera that can be fastened, for example, to a trunk lid of a vehicle, which is used for image acquisition of the outside area of the vehicle is disclosed in DE 10 2007 052 402.3. For example, such cameras can be used in assisted parking of the vehicles. The camera generates an image of the outside area, especially a rear view of the vehicle for the vehicle driver on a monitor within the vehicle compartment, which represents a significant support for the driver.

It is known to mount such cameras within a mounting module on different vehicle locations, like the trunk lid of a vehicle.

BRIEF SUMMARY

The task of the present invention is to modify a mounting module of the mentioned type so that the functionality of the overall arrangement is expanded.

For this purpose it is proposed according to the invention that the mounting module be designed with a housing on which a camera, which serves for image acquisition of the outside area of the vehicle, an activation element to activate a mechanical lock of the moving part and a moving protective element are arranged, which can be moved between a closed position and an open position. The activation element in the open position is accessible to the user and image acquisition of the outside area can be conducted by the camera. In the closed position the protective element simultaneously covers both the activation element and the camera. By integrating the activation element within the mounting module design space within the vehicle can be saved, on the one hand the expense during the mounting process is reduced, since both the camera and the activation element can be fastened on the moving part of the vehicle by the installer in one step. In addition, not only is the sensitive camera with its lens protected from environmental effects in the closed position of the protective element, but the activation element is also fully covered in the closed position of the protective element. In addition to the protective effect from environmental effects, like heat, moisture, dust, etc., the closed position of the protective element prevents unauthorized manipulation of the activation element by unauthorized persons. The protective element is advantageously equipped with an outer surface on which a manufacturer emblem or the like is applied.

In one possible variant of the invention the protective element is mounted to pivot around the axis. The protective element acts as a sort of flap that pivots around the axis from the closed position to the open position and vice-versa. A drive is preferably provided, which is effectively connected to the protective element. In the first place, it is conceivable here that the drive is arranged directly in or on the mounting module, especially on or in the housing of the mounting module. It is also conceivable in an alternative variant that a drive is provided, which is an effective connection with the protective element, the drive being arranged at least partially on the moving part outside of and at a distance from the mounting module, especially the housing of the mounting module. In the last named alternative the drive can therefore be removed from the mounting module so that a compact mounting module requiring limited design space is provided.

It is particularly advantageous that the protective element has a seal on the inside facing the camera, which lies on the camera and/or the mounting module, sealing it, in the closed position of the protective element. This effectively achieves a situation in which no dirt particles, moisture, etc. can reach either the camera or the activation element in the closed position. In this position of the protective element the lens of the camera, in particular, is effectively protected. The drive can be designed with a mechanism so that a certain force acts on the mounting module and/or the camera in the closed position of the protective element so that the protective element is effectively held in the closed position. During the opening process, on the other hand, the protective element with the seal is released from the mounting module and/or from the camera without sliding along the camera and without causing any traces of wear on the objective lens of the camera.

In another alternative of the invention the drive includes a Bowden cable, a pushrod, a rotating rod and/or a linkage. The linkage can comprise various lever elements effectively connected to the protective element. A gear linkage is also conceivable, which ensures corresponding movement of the protective element into its corresponding position. In an advantageous variant the drive, which is fastened with its motor to the moving part outside the mounting module, is provided with a Bowden cable fastened on the mounting module with a linkage part, the linkage part again being effectively connected to the protective element.

In a preferred variant of the mounting module according to the invention the drive cooperates with such a mechanism, especially a linkage, so that during movement from the closed position to the open position the protective element executes a two-phase movement. The special advantage of this connection is that during movement from the closed position to the open position the protective element is initially released from the camera in a first movement phase and separated from it without harmful contact occurring directly on the camera, especially its objective. After a defined interval following the first movement phase, between the protective element and the camera a second movement phase can be initiated which brings the protective element in the housing laterally toward the camera so that image acquisition of the outside area of the vehicle can be accomplished by the camera.

In a preferred variant the two-phase movement has a first movement phase in which the protective element is removed from the camera, in which case the protective element moves essentially in the recording direction simultaneously. The direction of movement of the protective element during its first movement phase preferably corresponds to roughly the recording direction of the camera. This means that the protective element is moved in the direction of the outside area of the vehicle which is to be recorded as an image via the camera. In an advantageous variant the protective element can be simultaneously removed from the camera over its entire surface, in which case the protective element is raised to the outside area of the vehicle. Movement of the protective element during the first movement phase can be translatory, for example. It is also conceivable that the protective element is removed from the camera via a rotational and/or pivot movement essentially in the recording direction of the camera before the second movement phase is initiated.

The linkage that acts on the protective element can be designed so that the protective element pivots around a second axis during the second movement phase which is not identical to the first axis around which the protective element moves during the first movement phase. During the second movement phase movement of the protective element around the first axis is advantageously blocked. The linkage here is advantageously designed so that the first movement phase and the second movement phase are executed sequentially. In another variant the two movement phases can also overlap and both movement phases can occur simultaneously at least partially, which means that the second movement phase via the linkage for movement of the protective element is already started before the first movement phase has ended.

It is also conceivable that the drive has a linkage with a lever mechanism so that malicious opening of the protective element in the direction of the open position is blocked from the outside area in the closed position of the protective element. In one possible variant the linkage is designed with a toggle lever which prevents the protective element from being opened from its closed position without authorization in order to gain access to the camera and to the activation element.

In the parked position of the vehicle, which means when the user has left the vehicle and locked it, the protective element is situated in its closed position so that the activation element and the camera are reliably protected. The activation element here can be an electrical switch element, like a button, switch, piezo element or the like. The protective element is then expediently moved from the closed position to the open position when the user is situated with authorization within the vehicle and has placed the vehicle in reverse. The rear outside area of the vehicle is made visible by the camera on a display within the vehicle, in which case the protective element is situated in the open position and the activation element is therefore simultaneously accessible from the outside area. It is also conceivable to place the mounting module in data communication with the closure device of the vehicle, especially the central locking, so that during unlocking of the closure device the protective element simultaneously moves into the open position. The user therefore has the opportunity to activate the activation element in order to open any moving part, especially the trunk lid. Preferably the closure element remains in the open position only for a defined period and automatically travels back to the closed position, if the activation element was not activated by the user. The camera, on the other hand, remains deactivated. The mounting module can advantageously be combined without problem with closure devices, especially keyless entry systems.

In an expedient that improves the invention a lock cylinder that is also covered in the closed position of the protective element can be arranged on the housing. The lock cylinder is preferably effectively connected to the mechanical lock of the moving part. An emergency key can be introduced to the lock cylinder, if the power supply of the vehicle, especially of the mounting module, has failed for any reason. The moving part can therefore be manually opened by the user with the emergency key, the lock being unlocked via the lock cylinder, especially opened.

A restoring device, especially a spring element, is advantageously provided, which acts on the protective element so that return movement of the protective element during movement from the open position to the closed position is ensured. It is also conceivable in another variant of the invention to arrange a proximity sensor on the housing of the mounting module, which detects the authorized user and therefore can trigger movement of the protective element from the closed position into the open position. In one possible variant of the invention the proximity sensor is designed as a capacitive sensor.

It is also conceivable that the protective element is equipped in one part as a cover or flap or that the protective element is configured in several parts, especially as a louver or central or shutter closure.

In another alternative of the mounting module the protective element can be designed heatable. For example, heating elements, especially heating wires, can run within the protective element, which ensure corresponding heating of the protective element. Should the protective element be frozen, for example, on the housing of the mounting module at low temperatures, this interfering situation can be eliminated in a very short time by heating of the protective element.

It can also be useful that an information signal is sent from the mounting module into the vehicle when the open position and/or the closed position of the protective element is reached. The user acquires a message within the vehicle via this information signal concerning the extent to which an open position and/or closed position of the protective element is present. This message can occur optically, acoustically or also haptically for the user.

It can also be advantageous to make the protective element from a material that is transparent or transparent on one side or so that the protective element can be brought into two states, a transparent and nontransparent state. It is therefore also conceivable that image acquisition of the outer area can be conducted in a transparent state or transparent state on one side, when the protective element is situated in the closed position.

It is also possible for the protective element to have a lens on its side facing the camera in which different recording views of the camera could be generated as a function of the position of the protective element. This means that image acquisition of the outside area is also possible in an intermediate position, which means between the open position and the closed position of the protective element. Depending on the corresponding position of the protective element, the lens arrangement of the protective element causes the recording view of the camera to be varied. Since the lens is arranged on the inside of the protective element, the lens is correspondingly protected from the outside area on this account.

In one possible variant of the mounting module a microphone and/or illumination element is provided, which is arranged on the protective element around the housing. As an alternative or in addition, the protective element as such can be designed as an illumination element. This means that, when the vehicle is in reverse, the protective element actively emits light as a light source. It is conceivable here that the protective element is provided with an OLED on its outer surface, which is not transparent, and image acquisition of the outside area is possible via the camera even when the protective element is in the closed position.

The invention also includes a situation in which the protective element can be designed in two parts, which means that a first protective element can be brought into an open position and into a closed position which covers the camera in the closed position. The second protective element can also be brought into a closed position and open position, in which case the activation element is covered in the closed position. Both protective elements can be moved by the drive independently of each other.

The protective element advantageously automatically travels into its corresponding position. This means that the protective element automatically travels from its open position to its closed position, for example, from a defined speed of the vehicle. It is also conceivable that the protective element remains in its corresponding position with time control. A further alternative of the invention can prescribe that the user can manually trigger within the vehicle a corresponding movement of the protective element to its closed position and/or its open position.

It can also be advantageous that the protective element has a cleaning element on its side facing the camera, which contacts the camera during movement of the protective element into its corresponding position so that any soiling on the camera can be removed. The cleaning element can be designed, for example, as a flow surface that is fastened to the inside of the protective element.

In a preferred variant of the invention a range finder can be arranged on the protective element or on the housing. When the vehicle is placed in reverse, the range finder is activated and, in addition to image acquisition of the outside area, provides the user of the vehicle with additional information concerning the distance to corresponding objects that are situated in the rear area.

BRIEF DESCRIPTION OF THE DRAWINGS

Additional advantages, features and details of the invention are apparent from the following description in which several practical examples of the invention are described in detail with reference to the drawings. The features mentioned in the claims and in the description can be essential to the invention individually or in any combination. In the drawings:

FIG. 1a shows a purely schematic view of the mounting module according to the invention with a camera, an activation element and a protective element, situated in the closed position, FIG. 1b shows the device according to FIG. 1a in which the protective element has been released from the camera, FIG. 1c shows the mounting module according to FIG. 1a in which the protective element is situated in the open position, FIG. 2a shows another variant of the mounting module according to FIG. 1a, FIG. 2b shows a mounting module according to FIG. 2a in which the protective element has been removed from the camera, FIG. 2c shows the mounting module according to FIG. 2a in which the protective element is situated in the open position, FIG. 3 shows a schematic view of the drive that ensures corresponding movement of the protective element, FIG. 4 shows a purely schematic side view of the mounting module in which the protective element is in the open position, FIG. 5 shows the mounting module according to FIG. 4 in which the protective element is in a position between the closed position and an open position, FIG. 6 shows the mounting module according to FIG. 4 in which the protective element is in the closed position, FIG. 7 shows another variant of the mounting module according to FIG. 4

DETAILED DESCRIPTION

Figure 8:
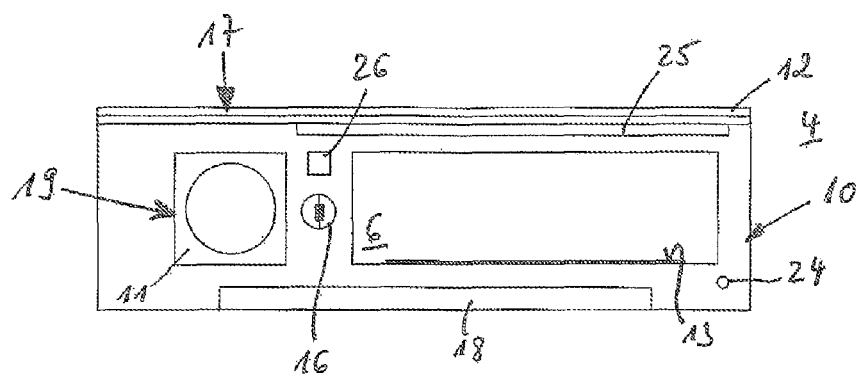
FIG. 8 shows another variant of the mounting module according to FIG. 4.

A very simplified view of the mounting module according to the invention is depicted in FIGS. 1a to 1c, which is mounted on a moving part of the vehicle, in the present practical example on the trunk lid of the vehicle, which is not explicitly depicted. The mounting module has a camera 11, which is used for image acquisition of the outside area 5 of the vehicle and an activation element 13 to activate a mechanical lock arranged on the trunk lid separated from the mounting module.

A moving protective element 12 is also arranged on the mounting module, which can be moved from a closed position 3, which is shown in FIG. 1a, to an open position 4 according to FIG. 1c. In the closed position 3 the camera 11 and the activation element 13, which is designed as an electrical switching element, is sealed off from the outside area 5 and inaccessible behind the protective element 12. The camera 11 is aligned in a recording direction 15 for image acquisition of the rear outside area 5. Image acquisition of camera 11 can be conducted in the open position 4 for protective element 12. During movement from the closed position 3 into the open position 4 the protective element 12 executes a two-phase movement. A first movement phase is characterized by a pivot movement of the protective element 12 around the first axis 14. During this first movement phase the protective element 12 is removed from the camera 11 and from the activation element 13 and moves essentially in the recording direction 15. Through this first movement phase a greater distance between protective element 12 and the camera 11 and the activation element 13 is initially created. In a subsequent second movement phase protective element 12 together with the first axis 14 is moved away from the front area of the camera 11. The protective element 12 is situated fully in the open position 4 and not visible for the user within a housing of the mounting module (not shown).

Another variant of the mounting module according to the invention is shown in FIGS. 2a to 2c, in which the first movement phase is characterized by a purely translatory movement of the protective element 12 in the direction of the recording direction 15. Starting from the closed position 3 according to FIG. 2a, a translatory movement of the protective element 12 occurs via a drive (not shown) so that the distance from the protective element 12 to camera 11 and activation element 13 is increased. The protective element 12 is then moved via the second movement phase, which is shown in FIG. 2c, from the front area into a rear housing area of the mounting module.

The protective element 12 according to FIGS. 1 and 2 can be moved into its corresponding position 3, 4 via a drive, the drive having an electric motor 23 in the variant according to FIG. 3, which is connected to a linkage 22 via a Bowden cable 21. The motor 23 is arranged outside the mounting module, which is shown in detail in FIGS. 4 to 8, which means that in the present practical example according to FIG. 3 the motor 23 is fastened to the trunk lid 1 of the vehicle. An effective connection between motor 23 and linkage 22 is achieved via the flexible Bowden cable 21. The linkage 22 can be moved via the Bowden cable 21 by a corresponding tensile force so that the protective element 12, which is effectively connected to linkage 22, experiences a corresponding movement into its corresponding position 3, 4.

FIG. 4 shows a mounting module having a moving protective element 12, which can be moved, for example, according to FIG. 1 or FIG. 2. Naturally it is conceivable that the protective element 12 merely executes a one-phase movement, which means it can be moved along a pivot axis from a closed position to an open position and vice-versa. The mounting module includes a housing 10 having a receptacle 19 within which the camera 11 is fastened. The housing 10, which is designed as a plastic injection-molded part, also has a pointed [sic: slit-like] receptacle opening 17 in which the protective element 12 is fully situated in its open position 4. An internal space 6 is provided to the side of camera 11 within which an activation element 13 is arranged to activate a mechanical lock 2 of the trunk lid 1. The activation element 13 can be designed as an electrical switch element, like a button, switch, piezo element or also a proximity switch. A corresponding activation of the activation element 13 causes the trunk lid lock 2 to be unlocked and the user can open the trunk lid 1.

During movement of the protective element 12 from its open position 4 according to FIG. 4 in the direction of the closed position 3 according to FIG. 6, the protective element 12 is moved from the slit-like receptacle 17 of the housing 10 and covers the internal space 6 and camera 11 during the movement phase (see FIG. 5) until the protective element 12 has finally reached its closed position 3 in FIG. 6. In the present practical example the protective element 12 lies against the housing 10 of the mounting module, sealing it, so that both the camera 11 and the activation element 13 are effectively protected from any environmental effects.

FIG. 7 shows another variant of the mounting module according to FIGS. 4 to 6. The essential difference in the mounting module according to FIG. 7 is that a lock cylinder 16 is additionally arranged on the housing 10 of the mounting module, which is effectively connected to a lock of the trunk lid 1 (not explicitly shown). An emergency key could be introduced to the lock cylinder 16, if a power supply of the mounting module of the vehicle is not present. Unlocking of the lock of the trunk lid 1 can be accomplished by the emergency key. As an alternative or in addition, a proximity sensor 18 can be provided on housing 10, which detects the approach of the authorized user and therefore causes corresponding activation of the drive so that the protective element 12 is automatically moved from its closed position 3 to open position 4.

FIG. 8 shows another variant of the mounting module having a moving protective element 12. The mounting module has all the features of the mounting module disclosed in FIG. 7. A microphone 24, an illumination element 25 and a range finder 26 are additionally provided on housing 10 of the mounting module as parking aids.

In the mounting modules according to FIGS. 4 to 8 a camera 11 is provided, which is arranged unmovable in housing 10. Naturally, in another variant not explicitly shown in the figures it is conceivable to provide a moving camera 11, which is introduced to the closed position 3 of protective element 12 within housing 10. In the open position 4 of protective element 12 the camera 11 is at least partially moved out of housing 10. The corresponding movement of camera 11 can occur via the same, identical drive that is also responsible for movement of the protective element 12.

The invention claimed is:

1. Mounting module on a trunk lid of a vehicle, the mounting module comprising
a housing having an opening
a camera adapted for image acquisition of an outside area of the vehicle, an activation element adapted to activate a mechanical lock of the truck lid,
a movable protective element adapted to be moved between an open position and a closed position, wherein
in the open position, the activation element is freely accessible to a user, and the camera conducts image acquisition of the outside area and
in the closed position, the movable protective element is adapted to close the opening of the housing simultaneously covering the activation element and the camera,
a drive which is effectively connected to the movable protective element and is arranged on or in the housing of the mounting module, wherein the drive is adapted to cooperate with a mechanism so that during movement from the closed position to the open position the movable protective element executes a two-phase movement, wherein the two-phase movement has a first movement phase in which the movable protective element moves along a longitudinal axis away from the camera and a second movement phase in which the movable protective element travels laterally in the housing toward the camera.

2. The mounting module according to claim 1, wherein the movable protective element is mounted to pivot around an axis.

3. The mounting module according to claim 1, further comprising a drive, which is effectively connected to the movable protective element, and is arranged at least in areas on the truck lid and outside, at a distance from the housing.

4. The mounting module according to claim 1, wherein the drive is a Bowden cable, a pushrod, a rotary rod and/or a linkage.

5. The mounting module according to claim 1, wherein the camera is arranged unmovable in the housing.

6. The mounting module according to claim 1, wherein the drive has a linkage with a lever mechanism adapted to block malicious opening from outside of the movable protective element in direction of the open position.

7. The mounting module according to claim 1, wherein a lock cylinder is arranged on the housing and the lock cylinder is covered in the closed position of the movable protective element.

8. The mounting module according to claim 1, wherein the housing has a slit-like receptacle opening for the movable protective element.

9. The mounting module according to claim 1, wherein a spring element is provided, which is adapted to acts on the movable protective element so that return movement of the movable protective element from the open position to the closed position is ensured.

10. The mounting module according to claim 1, wherein a sensor adapted to determine a proximity of an object is provided on the housing.

11. The mounting module according to claim 1, wherein the movable protective element has several parts.

12. The mounting module according to claim 1, wherein the movable protective element is heatable.

13. The mounting module according to claim 1, wherein the movable protective element is made from a material that is transparent or transparent on one side or from a material that is adapted to exist in two states, a transparent and a nontransparent state.

14. The mounting module according to claim 1, wherein the movable protective element has a lens on its side facing the camera, wherein different recording views of the camera can be generated as a function of the position of protective element.

15. The mounting module according to claim 1, further comprising a microphone and/or illumination element, which is arranged on the movable protective element or on the housing.

16. The mounting module according to claim 1, wherein the movable protective element is designed as an illumination element.

17. The mounting module according to claim 1, wherein the movable protective element has two parts.

18. The mounting module according to claim 1, wherein the movable protective element has a cleaning element on its side facing the camera, which contacts the camera during movement of the protective element into its corresponding position so that any soiling on the camera can be removed.

19. The mounting module according to claim 1, wherein a distance meter is arranged on the protective element or on the housing.

20. The mounting module according to claim 1, wherein an information signal is generated on reaching the open position and/or closed position of a protective element so that the user within the vehicle acquires a message concerning the position of the protective element.

21. The mounting module according to claim 1, wherein the mounting module is mounted to the trunk lid.

22. The mounting module according to claim 1, wherein the mechanical lock is distinct from, and arranged in a spaced relationship relative to, the mounting module.

23. The mounting module according to claim 1, wherein the movable protective element has one part.

24. Mounting module for a trunk lid of a vehicle comprising
a housing
a camera adapted for image acquisition of an outside area of the vehicle,
an activation element adapted to activate a mechanical lock of a moving part,
a movable protective element adapted to be moved between a closed position and an open position,
a drive which is effectively connected to the movable protective element and is arranged on or in the housing of the mounting module,
wherein the drive is adapted to cooperate with a mechanism so that during movement from the closed position to the open position the movable protective element executes a two-phase movement, wherein the two-phase movement has a first movement phase in which the movable protective element moves along a longitudinal axis away from the camera and a second movement phase in which the movable protective element travels laterally in the housing toward the camera,
wherein in the open position, the activation element is freely accessible to a user and the camera is adapted to acquire images acquisition of the outside area and in the closed position, the protective element simultaneously covers the activation element and the camera, wherein the activation element is designed as a switch or piezo element.

25. The mounting module according to claim 24, wherein the mounting module is mounted to the trunk lid.

26. The mounting module according to claim 24, wherein the mechanical lock is distinct from, and arranged in a spaced relationship relative to, the mounting module.

27. The mounting module according to claim 24, wherein the switch is an electrical switch element.

28. Mounting module on a trunk lid of a vehicle comprising
a housing,
a camera used for image acquisition of the outside area of the vehicle,
a switch or piezo element adapted to activate a mechanical lock of the trunk lid,
a movable protective element that can be moved between a closed position and an open position,
a drive which is effectively connected to the movable protective element and is arranged on or in the housing of the mounting module,
wherein the drive is adapted to cooperate with a mechanism so that during movement from the closed position to the open position the movable protective element executes a two-phase movement, wherein the two-phase movement has a first movement phase in which the movable protective element moves along a longitudinal axis away from the camera and a second movement phase in which the movable protective element travels laterally in the housing toward the camera,
in which the switch or piezo element is freely accessible to a user in the open position and configured to be activated by the user and image acquisition of the outside area is configured to be conducted and the protective element simultaneously covers the switch or piezo element and the camera in the closed position.

29. The mounting module according to claim 28, wherein the mounting module is mounted to the moving part.

30. The mounting module according to claim 28, wherein the mechanical lock is distinct from, and arranged in a spaced relationship relative to, the mounting module.

31. Mounting module on a moving part of a vehicle, comprising:
a housing,
a camera situated within said housing adapted acquire image of the outside area of the vehicle,
an activation element to activate a mechanical lock of the moving part,
a movable protective element that can be moved between a closed position and an open position,
a drive which is effectively connected to the movable protective element and is arranged on or in the housing of the mounting module,
wherein the drive is adapted to cooperate with a mechanism so that during movement from the closed position to the open position the movable protective element executes a two-phase movement, wherein the two-phase movement has a first movement phase in which the movable protective element moves along a longitudinal axis away from the camera and a second movement phase in which the movable protective element travels laterally in the housing toward the camera,
in which the activation element is freely accessible to a user in the open position and image acquisition of the outside area can be conducted and the movable protective element simultaneously covers the activation element and the camera in the closed position, wherein the movable protective element and the moving part are separate components.

32. The mounting module according to claim 31, wherein the mounting module is mounted to the moving part.

33. The mounting module according to claim 31, wherein the moving part is a trunk lid.

34. The mounting module according to claim 31, wherein the mechanical lock is distinct from, and arranged in a spaced relationship relative to, the mounting module.

* * * * *